Oct. 12, 1926.                                                    1,602,419
W. F. STAGGERS ET AL
ADJUSTABLE TOOL FOR TIGHTLY APPLYING NONSKID CHAINS
Filed Feb. 25, 1924
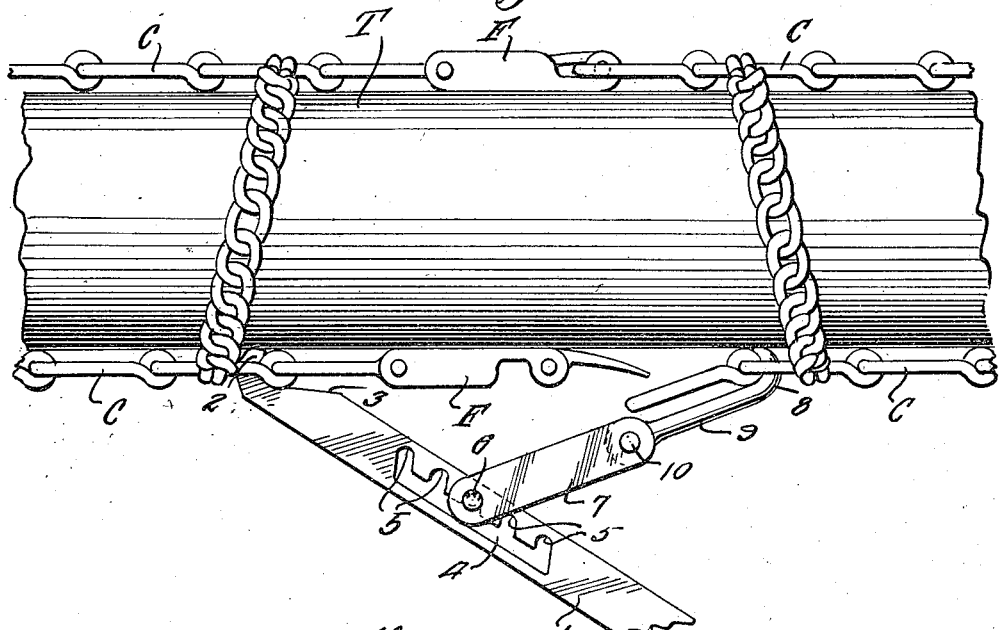
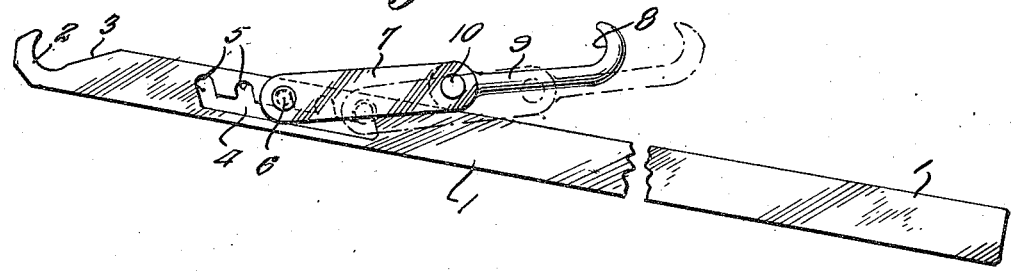
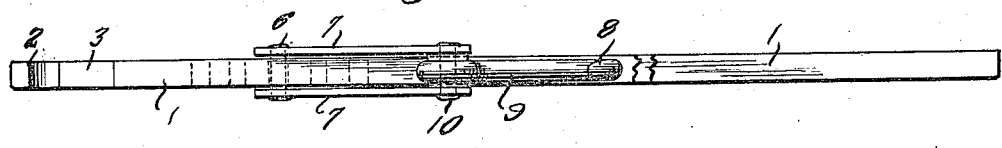
Inventors
William F. Staggers
and Cris Sander Jr.
By Lester L. Sargent
Attorney Patented Oct. 12, 1926.

1,602,419

UNITED STATES PATENT OFFICE.

WILLIAM F. STAGGERS, OF MANNINGTON, AND CHRIS SANDER, JR., OF WHEELING, WEST VIRGINIA; SAID STAGGERS ASSIGNOR TO SAID SANDER, JR.

ADJUSTABLE TOOL FOR TIGHTLY APPLYING NONSKID CHAINS.

Application filed February 25, 1924. Serial No. 694,959.

The object of our invention is to provide an improved tool by means of which non-skid chains may readily be put on automobile tires and stretched tight so as to permit easy fastening of the hook or buckle that holds the chains on the tire; and to provide novel means for readily and quickly adjusting this device to operate on chains of different lengths; and to provide a device which is useful to pull two ends of chains together under any circumstances. We attain these and other objects of our invention by the tool illustrated in the accompanying drawings, in which Fig. 1 is a top plan of an automobile wheel, showing our tool in use in stretching a chain which is being put on the wheel;

Fig. 2 is a side elevation of our device with its hook members spread apart to their extreme limit, an adjusted position of the device being shown in dotted lines; and Fig. 3 is an edge view of our tool;

Like characters of reference indicate like parts in each of the several views.

Referring to the accompanying drawings, T designates an automobile tire; C the side chain members of a non-skid chain; and F a conventional fastener or hook for fastening the side chains. Our device consists of a suitable handle 1, terminating in an end hook 2, the handle 1, being tapered at 3 toward the inside of the hook 2. We provide a longitudinal slot 4 in the handle 1. Opening into the slot are a series of spaced forwardly extending notches 5 of suitable size and shape to releasably receive the pin 6, which has its ends affixed in the spaced links 7, the pin 6 functioning as a pivot member. We provide an elongated hook 8, having its shank end 9 pivotally secured to links 7 by the pin 10. The links 7 are of sufficient length to allow the shank end 9 of hook 8 to swing freely past hook 2.

The manner of operating this tool is illustrated in Figs. 1 and 2 of the drawings. The respective hooks 2 and 8 are engaged in links at or near the free ends of one of the side chains, or of any chains the ends of which are to be brought together, and the handle 1 is manipulated or swung in the direction of hook 2, thereby pulling the ends of the chains C toward each other, and permitting of readily securing the fastener F in its closed or fastened position. The slot 4 is of sufficient width so that pin 6 and links 7 may be adjusted either toward, or to a point distant from, the hook 2, thereby either lengthening or shortening the distance spanned between hooks 2 and 8, as may be required in any particular instance. This operation is readily and quickly done by hand, and does not require the use of a screw driver or any other tool.

What we claim is:

1. An adjustable tool for tightly applying non-skid chains, comprising a handle, a hook formed at the end of and aligned with the handle, the handle having a slot extending longitudinally thereof, said handle having a series of notches opening into the slot, a pair of links pivotally and adjustably mounted in the slotted portion of the handle, and a hook pivotally mounted on the pair of links.

2. In an adjustable tool for tightly applying non-skid chains, the combination of a handle terminating in a hook aligned with the handle and disposed at one end thereof, the handle being bevelled toward the inner portion of the hook, the handle having a slot extending longitudinally thereof, and spaced notches opening into the slot, links pivotally and adjustably mounted in the slotted portion of the handle, and an elongated hook having its shank pivotally attached to one end of the links.

3. In an adjustable tool for tightly applying non-skid chains, the combination of a handle having a hook formed at one end thereof and aligned with the handle, and having a slot in proximity to the hook end and extending longitudinally of the handle and having a series of spaced slanting notches opening into the longitudinal slot, a pin adjustably movable into said slot extensions of the handle and functioning as a pivot member, links attached to the pin, and a hook pivotally attached to the links, whereby the device may be readily and quickly adjusted to operate on chains of different lengths.

4. In a device of the class described, the combination of a handle, said handle having a hook formed on one end and aligned longitudinally of the handle, the handle having a longitudinal slot and having a series of spaced forwardly extending notches, a pair of flat links adjustably mounted in the slot, and a hook pivotally mounted on said pair of links, said links being of sufficient length to permit the pivotally mounted hook to be swung over the end of the hook formed on the handle the aforesaid pivotally mounted hook and the hook on the handle lying in approximately the same plane when in opened position.

WILLIAM F. STAGGERS.
CHRIS SANDER, Jr.